(12) United States Patent
Malo

(10) Patent No.: US 6,911,659 B1
(45) Date of Patent: Jun. 28, 2005

(54) METHOD AND APPARATUS FOR FABRICATING AND TRIMMING OPTICAL FIBER BRAGG GRATING DEVICES

(75) Inventor: Bernard Malo, Gatineau (CA)

(73) Assignee: Avanex Corporation, Fremont, CA (US)

(*) Notice: Subject to any disclaimer, the term of this patent is extended or adjusted under 35 U.S.C. 154(b) by 420 days.

(21) Appl. No.: 10/156,237

(22) Filed: May 29, 2002

Related U.S. Application Data

(60) Provisional application No. 60/293,511, filed on May 29, 2001.

(51) Int. Cl.[7] .................................................. G02B 6/34
(52) U.S. Cl. ...................... 250/492.1; 385/37; 385/123; 355/53
(58) Field of Search .................. 250/492.1; 385/37, 385/123; 355/53

(56) References Cited

U.S. PATENT DOCUMENTS

| | | | |
|---|---|---|---|
| 4,900,119 A | 2/1990 | Hill et al. | |
| 5,367,588 A | 11/1994 | Hill et al. | |
| 6,043,497 A | 3/2000 | Quetel et al. | |
| 6,160,261 A | 12/2000 | Hoshino | |
| 6,249,624 B1 | * 6/2001 | Putnam et al. | 385/37 |
| 6,307,617 B1 | * 10/2001 | Nishiki et al. | 355/53 |
| 6,741,349 B1 | * 5/2004 | Sweatt et al. | 356/328 |

* cited by examiner

Primary Examiner—John R. Lee
Assistant Examiner—Zia R. Hashmi
(74) Attorney, Agent, or Firm—Moser, Patterson & Sheridan, L.L.P.

(57) ABSTRACT

A method and system for the controlled irradiation of optical fibers in a process for fabricating optical fiber components such as Bragg grating devices. A beam of ultraviolet light is passed through a narrow slit in a mask to form a narrow beam of light. The narrow beam is focused into a line image that is directed onto the optical fiber to produce a photo-induced refractive index change in the optical fiber. The intensity and configuration of the line image as it impinges the optical fiber is controlled to reduce detrimental effects to the fiber.

14 Claims, 3 Drawing Sheets

METHOD AND APPARATUS FOR FABRICATING AND TRIMMING OPTICAL FIBER BRAGG GRATING DEVICES

This application claims the benefit of U.S. Provisional Application No. 60/293,511 filed May 29, 2001.

FIELD OF THE INVENTION

This invention relates to optical components including, but not limited to, optical fiber Bragg gratings and more particularly to an improved method and apparatus for fabricating and/or trimming such optical components.

BACKGROUND

In optical fibers and optical components the refractive index of the materials used to manufacture the fibers and components is important as it governs the speed at which light travels through the medium. In certain applications it is necessary that the refractive index of the medium be altered selectively. In many of the optical fibers used in optical communications systems the refractive index can be permanently modified through exposure to ultraviolet light. This technique is used to adjust the effective optical path length in devices such as fiber Mach-Zehnder or Michelson interferometers or to write gratings such as fiber Bragg gratings. U.S. Pat. No. 5,367,588 which issued Nov. 22, 1994 to Hill et al. describes the inscription of fiber gratings and U.S. Pat. No. 4,900,119 which issued Feb. 13, 1990 to Hill et al. discloses an all fiber Mach-Zehnder application.

Fiber Bragg gratings are used in optical systems in such applications as; amplifiers, filters and add/drop (de) multiplexers. Fiber gratings are typically written by selectively exposing an optical fiber to a periodic pattern of intense ultraviolet light. The exposure creates a permanent increase in the refractive index of the fiber to produce a fixed index modulation in accordance with the exposure pattern. This fixed index modulation is known as a grating. In a fiber a small amount of light is reflected at each periodic refraction change. All of the reflected light signals combine coherently to one large reflection at a particular wavelength when the grating period is equal to one half the wavelength of a light signal carried by the fiber divided by the effective index of refraction. This wavelength is called the Bragg wavelength.

In the process of fabricating optical components, such as Bragg gratings, by ultraviolet irradiation it is common to expose the fiber with a high intensity ultraviolet laser. The intensity of the laser beam striking the fiber needs to be large in order to achieve the necessary photo-induced refractive index change. Typically, a cylindrical lens that focuses the light along a line parallel to the fiber axis is used for this purpose. While the fiber must be close to the focal point of the lens to benefit from a large enhancement of intensity, it must not be too close to the focal point or else a reduction of the fiber mechanical strength will occur through ultraviolet induced defect creation in the fiber material. In an extreme case this can lead to catastrophic damage, such as breakage, to the fiber itself. If no special means are available to help, it is quite difficult to control the light intensity at a desired, reproducible level.

Typically, attempts to solve the above problem have relied on standard text-book optical techniques in which the focal point of the lens is determined using a burn pattern and then a micrometer driven stage is used to position the fiber at a known distance from the focal point. In this technique, the laser beam intensity at the fiber is known only approximately. As well the whole fiber surface is subjected to the irradiation.

SUMMARY OF THE INVENTION

The solution provided by the present invention improves on classical techniques in the following ways: the fiber-lens distance is rapidly, easily, and reproducibly adjusted, and furthermore only a small cross-section of the fiber is irradiated. As a consequence, the probability of either catastrophically damaging the fiber or reducing its mechanical strength is greatly reduced.

The basic solution is to place a blocking mask, with a rectangular slit of large aspect ratio (very narrow and long), in a plane perpendicular to the laser beam path. The long direction of the slit is parallel to the fiber. A cylindrical lens is placed downstream of the slit in such a way as to form a de-magnified image of the slit on the optical fiber. The imaging condition is verified by observing the light pattern on a screen placed behind the fiber.

Therefore in accordance with a first aspect of the present invention there is provided a method of exposing an optical fiber to ultraviolet irradiation comprising: directing a beam of ultraviolet light onto a blocking mask having a slit opening to thereby generate a narrow beam of ultraviolet light exiting the slit opening; focusing the narrow beam with a cylindrical lens to form a line image; and locating the optical fiber relative to the line image such that the line image impinges on the optical fiber.

In one embodiment of the invention a phase mask, located between the cylindrical lens and the fiber, is used to define a grating modulation pattern when the purpose of the irradiation is to write a grating in the fiber. An amplitude mask, having a particular transmission profile, may also be used with the phase mask or in place of the phase mask for optical trimming purposes.

In accordance with a second aspect of the present invention there is provided a system for irradiating an optical fiber comprising: a light source to generate a beam of ultraviolet light; a blocking mask positioned in the beam of ultraviolet light, the blocking mask having a narrow slit opening to generate a narrow beam of ultraviolet light; a cylindrical lens positioned downstream of the slit to focus the narrow beam into a line image; and positioning means to accurately locate the optical fiber in relation to the line image.

In one embodiment of this aspect of the invention a phase mask is positioned between the cylindrical lens and the fiber for use in writing a grating. An amplitude mask may be used with the phase mask or in place of the phase mask for a trimming operation.

BRIEF DESCRIPTION OF THE DRAWINGS

The invention will now be described in greater detail with reference to the attached drawings wherein:

FIG. 2 is a not to scale side view of the basic set up as shown in

FIG. 1 including a phase mask for grating formation; and

DETAILED DESCRIPTION OF THE INVENTION

Figure 1:
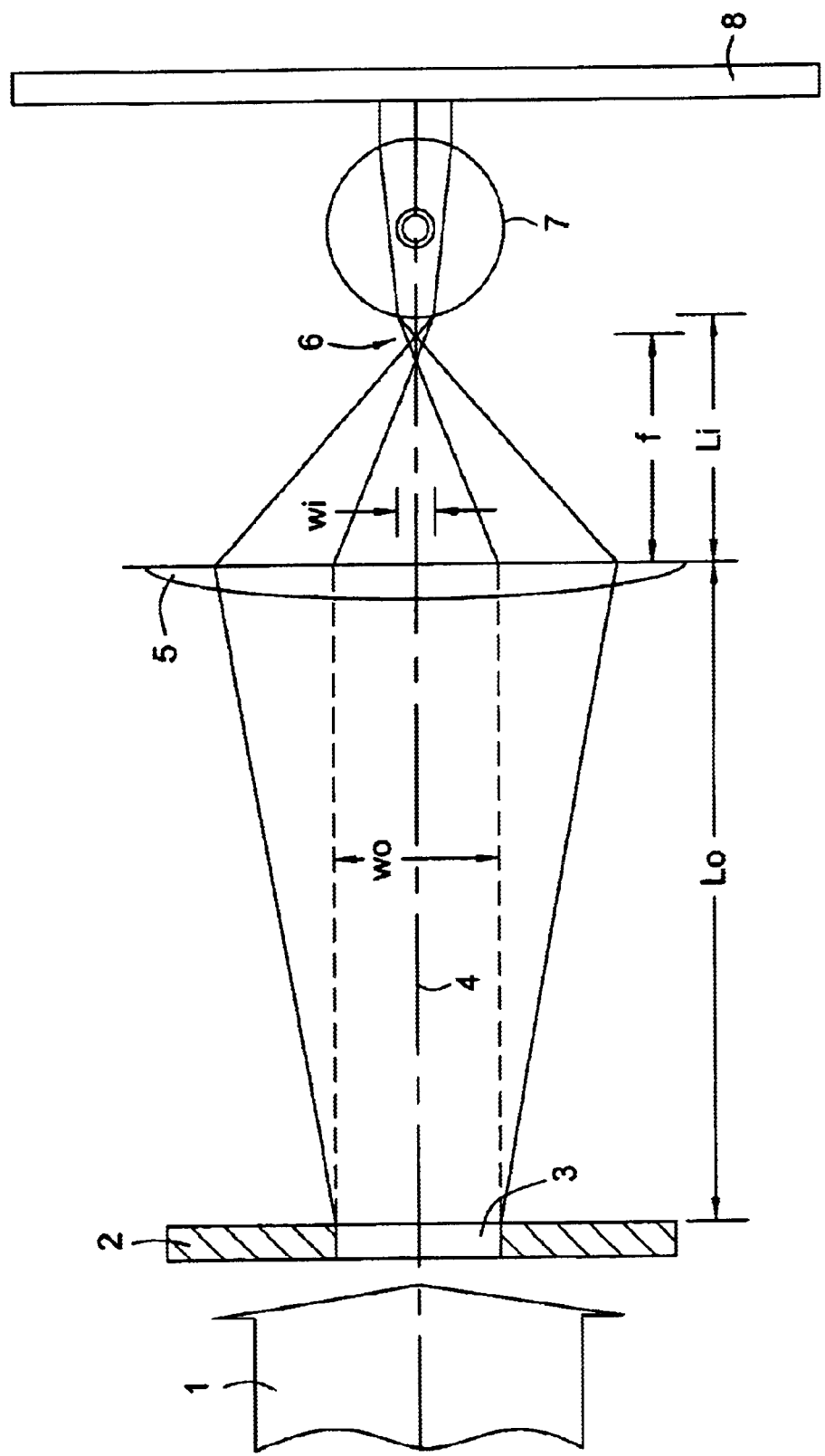
FIG. 1 is a not to scale side view of the basic set up according to the invention.

FIG. 1 provides a side view of the arrangement of the aperture, lens and optical fiber according to a basic embodiment of the present invention. In this embodiment of the invention a light beam 1, such as a beam from an ultraviolet laser with lateral dimensions larger than those of the slit to be used, is incident on the blocking mask 2 in which a slit opening 3 has been formed. The slit opening 3, as will become apparent later, determines the width and length of the irradiated portion of the fiber for a particular system arrangement. Accordingly, it is within the scope of the present invention to provide the blocking mask with a fixed slit opening or with movable elements whereby the dimensions of the slit opening can be adjusted.

Without loss of generality or applicability of the method, lenses may be used either before or after the slit to expand or reduce the beam cross-section as needed. The slit opening 3 is centered on the optical axis 4 of the light beam 1. A cylindrical lens 5, also centered on the optical axis 4, is aligned with its cylindrical axis parallel to the long dimension of the slit 3. The lens forms a line image of the slit on a plane 6 located near the surface of the fiber 7. The image of the slit is typically much narrower than the diameter of the fiber. The distance between the fiber 7 and the plane 6 is then adjusted so that the fiber itself acts as a cylindrical lens and collimates the light in a parallel beam, as observed on a screen 8 located downstream from the fiber. Any misalignment between the slit long side, the axis of the cylindrical lens and the fiber axis give rise to severe distortions of the light patch observed on the screen 8. The adjustment of the fiber-lens distance is very easily obtained by looking for the smallest, sharpest light pattern on the screen.

Figure 2:
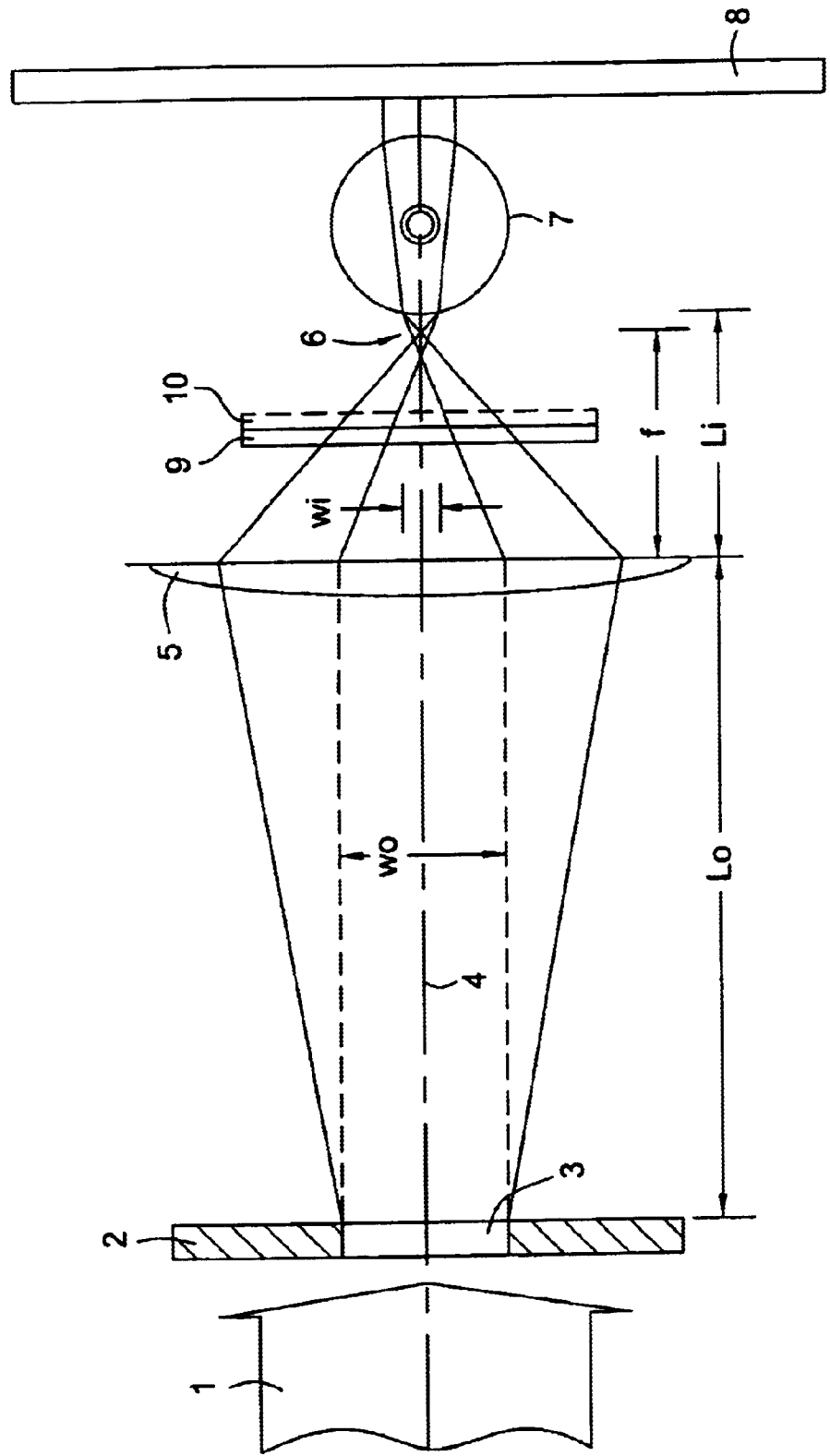

FIG. 2 illustrates an embodiment of the invention in which the irradiation is used to produce a grating such as a Bragg grating. As shown in FIG. 2 a phase mask 9 is positioned between the lens 5 and the fiber 7. A phase mask is, typically a thin flat slab of silica with a pattern of fine parallel troughs etched on one side, preferably the side closest to the fiber. The phase mask diffracts light in two directions toward the fiber where they generate an interference pattern that covers a segment of the fiber. Regions of high and low intensity alternate, with the high intensity regions forming the photo-induced refractive index change required for the grating.

An amplitude mask 10 can be placed adjacent the phase mask 9, as shown in dotted line in FIG. 2, or the amplitude mask can be used on its own. The amplitude mask, typically, has a transmission profile such that the intensity of the beam passing through it is not constant. This profile may, for example, give a linear variation from one end of the light beam to the other. Other profiles are possible depending on the application. The amplitude mask is used to chirp, adjust or trim the effective optical path length in an interferometer application or to tailor the profile of a grating.

It will be apparent from FIGS. 1 and 2 that the fiber 7, in effect, constitutes a lens with a very short focal length. Consequently, the light intensity striking fiber 7 is approximately the same as the intensity at the image plane 8. The intensity of the light at fiber 7 is obtained from classical optics by multiplying the light intensity at the slit by the magnification of the cylindrical lens (M=$W_i$/Wo where M is magnification of the lens; $W_i$ is the width of the image at the image plane; and $W_o$ is the width of the slit). The magnification is also given by the ratio of the image ($L_i$) distance and object ($L_o$) distance from the lens. In practice, since $L_i$ is rather small and must be known quite accurately to determine M precisely, it is easier to accurately measure $L_o$ and calculate $L_i$ from the following formula, where f is the precisely known focal length of the cylindrical lens:

$$1/L_i + 1/L_o = 1/f$$

If a mask 9 and/or 10 with a non-zero optical thickness is placed between the lens and fiber after an initial set up, the lens-fiber distance must be changed slightly to maintain the conditions of the imaging of the slit.

It will be apparent that fiber 7 is retained in a suitable holder (not shown) having a micrometer adjustment which allows its position with respect to lens 5 to be controlled accurately. It will also be apparent to one skilled in the art that the fiber can be in a fixed position and the lens assembly moved as necessary. Screen 8 provides an operator with an accurate indication of the positioning of the various elements of the system. Once the image on the screen shows a sharp reproduction of the line image the operator knows that all elements are properly positioned for irradiation. Typically, this part of the set up will be performed using a low repetition rate of the driver powering the laser to avoid mechanical damage to the fiber.

Figure 3:
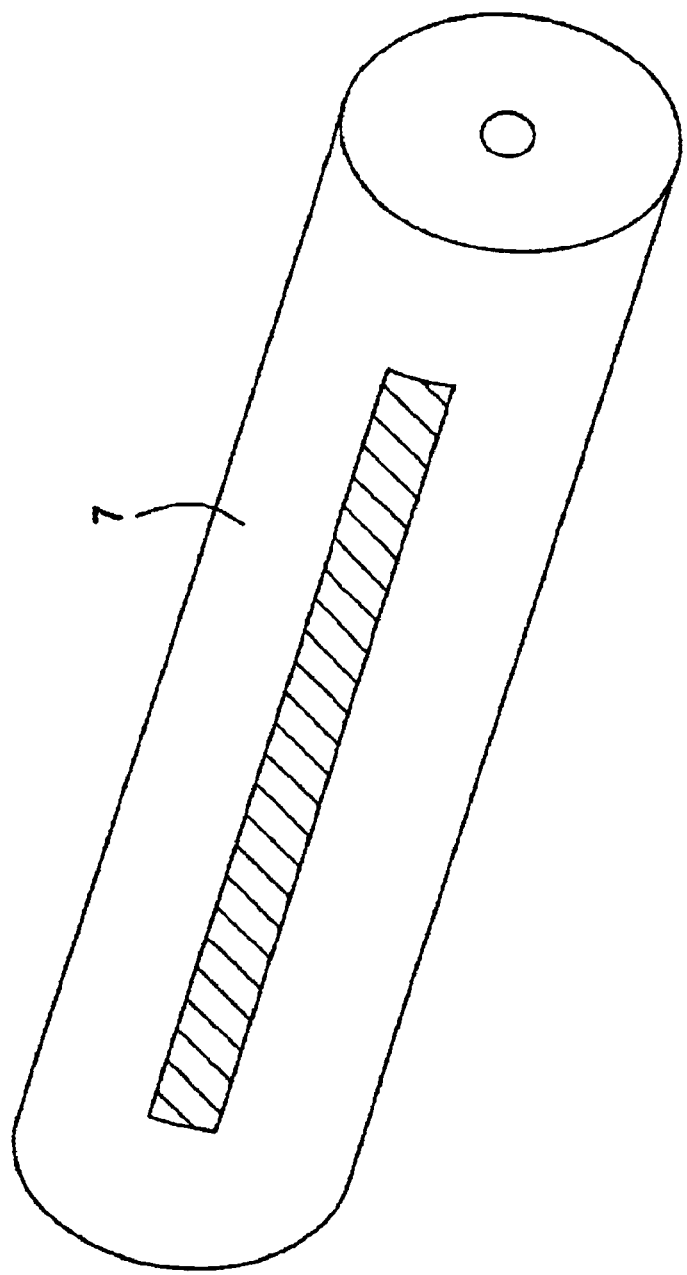
FIG. 3 is an oblique view of an optical fiber with a typical region of irradiation obtained with the present system.

An advantage of the present solution is that only a small portion of the outside fiber surface is illuminated by the high intensity ultraviolet irradiation. As shown in FIG. 3 a typical region of irradiation covers only a portion of the surface. The length and width of the irradiated region is a function of the dimensions of the slit in the blocking mask. Therefore the probability of generating strength-debilitating surface defects is minimized. In volume production this yields a greatly improved yield for devices which must perform at a given proof test tensile strength. The reproducibility of the method is excellent since the fiber-length distance can be controlled to within 20 microns under usual conditions, i.e. a slit with a width of the order of 0.1 to 1 mm and a length of at least several millimeters, and a system magnification of the order of 10 or more. When the slit and the lens are kept fixed, placing and aligning fibers in the grating fabrication set-up can be achieved to the tolerance mentioned above within less than one minute. An additional advantage is that masks and fibers are never damaged because very little light is present past the slit. In fact, all the elements in the beam path (lenses, mirrors, phase masks and/or amplitude masks, etc.) are less susceptible to long term radiation damage since the light intensity striking all the elements in the beam path is kept to the minimum necessary.

The method discussed herein is applicable to all the products which incorporate Fiber Bragg grading filters, including optical add-drop (de)multiplexers based on the all-fiber Mach-Zehnder interferometers. It is especially important to control the potential fiber strength reduction in applications where long-term reliability is critical, such as submarine use, and also in applications where fibers are subjected to large strains, such as some sensor applications.

This fabrication technique is of particular interest to the manufacture of Fiber Bragg gratings since it improves the fabrication yield significantly. In the fabrication of gratings and other optical components a light signal is typically passed through the fiber during irradiation as a means of monitoring the effect of the irradiation.

While particular embodiments have been described and illustrated it will be apparent to one skilled in the art that numerous changes can be made without departing from the intended spirit and scope of the invention as defined by the appended claims.

I claim:

1. A method of selectively irradiating an optical fiber comprising:

directing a beam of ultraviolet light onto a blocking mask having a slit opening to thereby generate a narrow beam of ultraviolet light exiting the slit opening;

focusing the narrow beam with a cylindrical lens to form a line image; and locating the optical fiber relative to the line image such that the line image impinges on a surface of the optical fiber.

2. The method as defined in claim 1 wherein said beam of ultraviolet light is generated by a laser.

3. The method as defined in claim 1 wherein the surface of the optical fiber collimates the line image into a parallel beam that passes through the optical fiber.

4. The method as defined in claim 3 wherein the parallel beam is projected onto a screen located downstream of the optical fiber, the projected image providing an indication of any misalignment of the line image on the surface of the optical fiber.

5. The method as defined in claim 4 wherein the optical fiber is relocated if necessary in order to correct any indicated misalignment.

6. The method as defined in claim 1 wherein the intensity of the line image as directed to the surface of the optical fiber is given as the product of the intensity of the light at the slit opening and the magnification of the cylindrical lens.

7. The method as defined in claim 6 wherein the magnification is given as the ratio of the distance between the lens and surface of the optical fiber and the distance between the lens and the blocking mask.

8. A system for irradiating an optical fiber comprising:
   a light source to generate a beam of ultraviolet light;
   a blocking mask positioned in the beam of ultraviolet light, the blocking mask having a narrow slit opening to generate a narrow beam of ultraviolet light;
   a cylindrical lens positioned downstream of the slit to focus the narrow beam into a line image; and
   positioning means to accurately locate the optical fiber in relation to the line image.

9. The system as defined in claim 8 further having a screen located downstream of the optical fiber, the screen displaying a replica of the line image for use in confirming positioning of the optical fiber relative to the line image.

10. The system as defined in claim 8 wherein the light source is a laser.

11. The system as defined in claim 8 further having a phase mask between the cylindrical lens and the fiber to generate an interference pattern for writing a grating in the optical fiber.

12. The system as defined in claim 8 further having an amplitude mask between the cylindrical lens and the fiber to adjust the intensity of the line image impinging on the fiber.

13. The system as defined in claim 11 further having an amplitude mask associated with the phase mask to selectively adjust the intensity of the interference pattern.

14. The system as defined in claim 8 wherein the length and width dimensions of the slit in the blocking mask are variable.

* * * * *